US005532521A

United States Patent [19]

Leininger

[11] Patent Number: 5,532,521
[45] Date of Patent: Jul. 2, 1996

[54] SECURITY CONTROL SYSTEM FOR THE STORAGE AREA OF A DELIVERY TRUCK

[76] Inventor: Robert L. Leininger, 1711 Ave. L, Fort Madison, Iowa 52627

[21] Appl. No.: 161,067

[22] Filed: Dec. 3, 1993

[51] Int. Cl.⁶ ................................................. B60R 25/00
[52] U.S. Cl. ........................... 307/10.2; 49/362; 70/256; 180/289; 292/144; 296/146.4
[58] Field of Search .................... 307/9.1–10.6, 307/114; 292/DIG. 46, 144; 340/825.31, 825.32, 825.69, 825.72; 49/362; 180/289, 287; 70/237, 255, 256, 257, 100, 99; 296/146.1, 155, 146.4

[56] References Cited

U.S. PATENT DOCUMENTS

| | | | |
|---|---|---|---|
| 3,735,531 | 5/1973 | Kramer | 49/362 |
| 4,782,674 | 11/1988 | Johnson | 70/100 |
| 4,848,832 | 7/1989 | Starnes | 296/155 |
| 4,850,139 | 7/1989 | Tiesler | 296/155 |
| 4,866,963 | 9/1989 | Leininger et al. | 70/256 |
| 4,920,698 | 5/1990 | Friese et al. | 49/362 |
| 4,995,195 | 2/1991 | Olberding et al. | 49/362 |
| 5,307,048 | 4/1994 | Sonders | 307/10.2 |
| 5,351,512 | 10/1994 | Pearlman | 70/257 |
| 5,357,143 | 10/1994 | Lehr et al. | 307/10.1 |
| 5,378,036 | 1/1995 | Townsend | 296/155 |

Primary Examiner—William M. Shoop, Jr.
Assistant Examiner—Richard T. Elms
Attorney, Agent, or Firm—Thomas E. Frantz

[57] ABSTRACT

A keyless system for quickly and conveniently securing the storage area of a delivery type truck against unauthorized entry and theft while the driver is away from the truck making a delivery or pickup. In reaching a delivery point or approaching the truck after a pickup, the driver actuates a portable transmitter to generate a wireless signal which is received and processed by a receiver within the truck and which unlocks and opens the access door to the storage area. Upon exit from the storage area after selecting or depositing a package, the driver simply taps a switch located in the cab of the truck to generate a signal which causes the access door to close and lock automatically. Securement of the rear cargo loading door also is controlled by use of the portable transmitter to generate a further signal for operating the loading door lock.

8 Claims, 2 Drawing Sheets

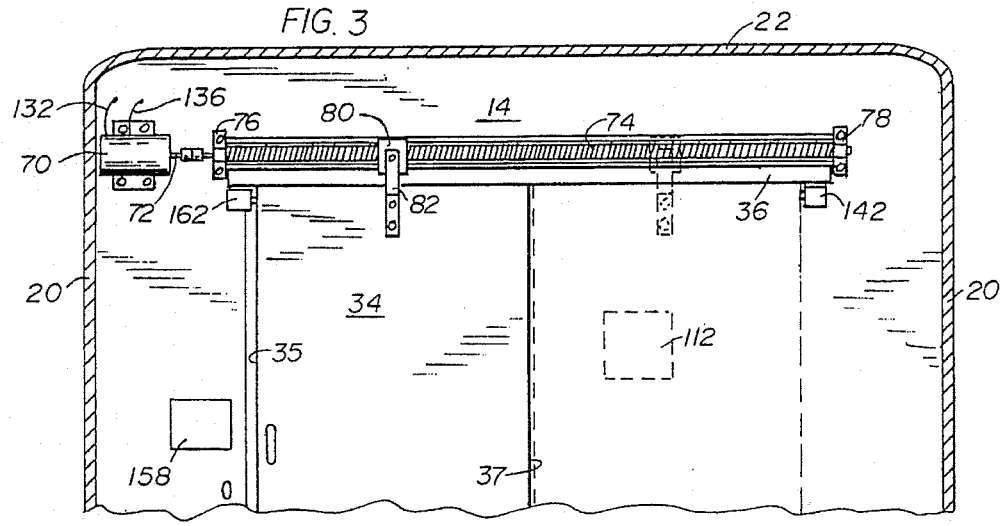
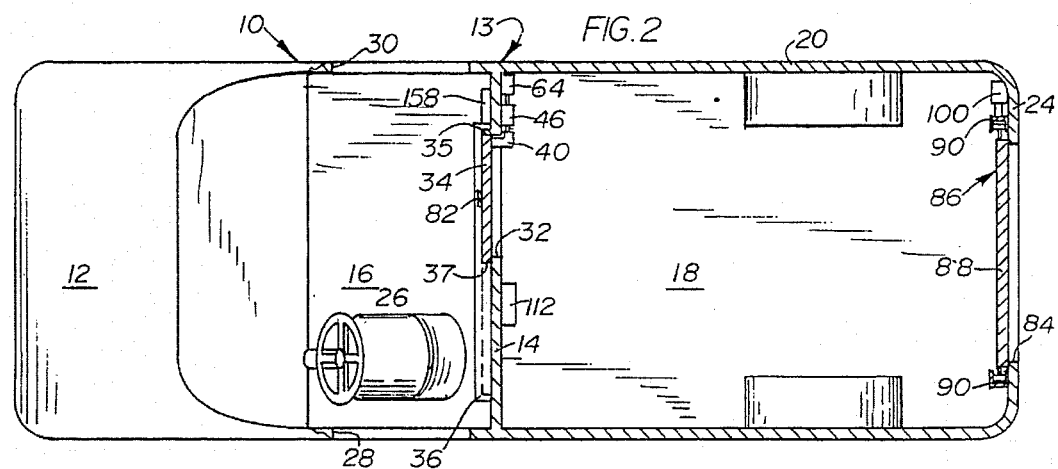
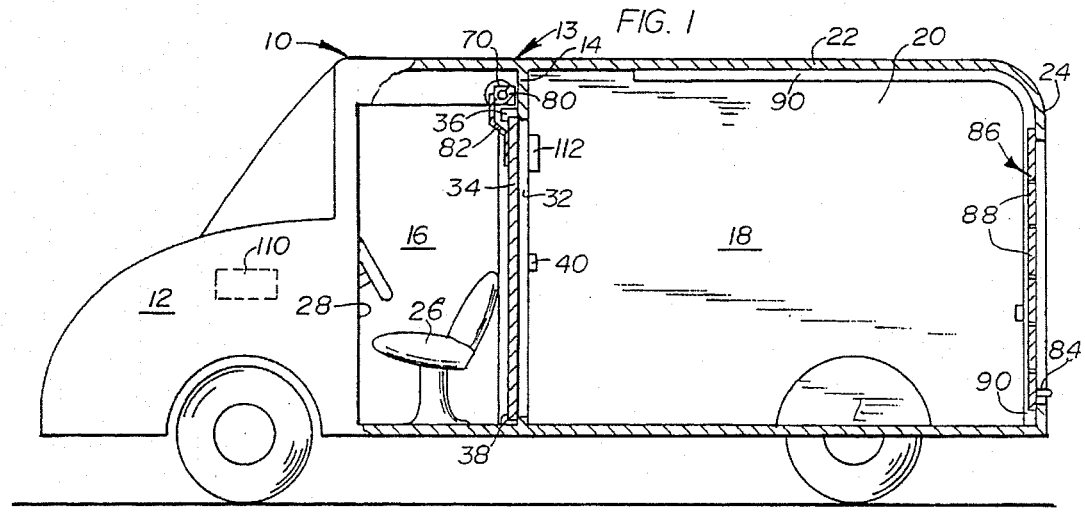

SECURITY CONTROL SYSTEM FOR THE STORAGE AREA OF A DELIVERY TRUCK

The present invention relates generally to security systems for mobile units and more particularly to a keyless system for controlling access to the closed storage area of a transport unit such as a delivery truck of the type used widely for delivering and picking up packages. The interior of the usual delivery truck is divided by a bulkhead into a forward cab area and a rearward storage area, with a doorway through the bulkhead to provide access to the storage area. For security purposes the bulkhead includes a sliding door which the driver is expected to keep closed and locked any time he/she leaves the truck to make a pickup or delivery. Also, while the rear loading door of the truck should be kept locked to prevent pilferage and theft, it must be conveniently and quickly opened for loading or to provide access to the storage area from the rear of the truck.

BACKGROUND OF THE INVENTION

Particularly in the larger cities where theft and pilferage are widespread, delivery trucks are a prime target of thieves as such trucks frequently are unoccupied for periods of time while the drivers are away from their trucks delivering or picking up packages. In an effort to combat such theft, most delivery firms now use a truck with security arrangements consisting of (i) an enclosed storage area having a rear loading door which normally is kept locked after the truck has been loaded for the day's deliveries and (ii) a bulkhead positioned internally of the vehicle between the cab and storage areas and provided with a sliding door which is to be kept locked any time the driver is not in the truck.

In theory, such security arrangements should provide adequate protection. As a practical matter, however, they often fail because of the time and effort required of a driver to manually unlock, open, close and relock the interior sliding door every time a delivery or pickup is made. Depending upon the number of deliveries and/or pickups made, the average driver can lose one half to one hour per day in locking, unlocking, opening and closing the interior security door. Wishing to avoid this loss of time and complete their rounds as quickly as possible, many drivers tend to leave the interior security door unlocked and even open while out of their trucks making a delivery or pickup. As a result, considerable theft still occurs.

Over the years, various suggestions have been proposed for locks and locking systems intended to improve the security of delivery trucks and other types of vehicles and mobile units. Aside from the system disclosed in U.S. Pat. No. 4,866,963, however, none of these prior suggestions have met with any significant success in providing an effective, safe, inexpensive and simple security system capable of meeting the needs of today's transportation and delivery industry.

SUMMARY OF THE INVENTION

To effectively combat today's theft and pilferage problems, the present invention provides a system for quickly and conveniently opening and closing the interior security door of a delivery truck or like mobile unit and for automatically locking both the security and rear loading doors upon their closure. The system can be installed easily and inexpensively either as part of the original factory equipment or as optional equipment to be added later. And while it is relatively simple in operation, the system is highly effective and efficient.

In one embodiment, the present invention provides an electronically controlled security system which unlocks and opens the internal security door of a delivery truck in response to a wireless signal generated by the driver using a small portable transmitter upon reaching a delivery point or returning to the truck after a package pickup. In leaving the storage area after selecting a package to be delivered or storing a package just picked up, the driver merely taps a switch with an elbow or hand to close and automatically lock the interior security door.

The same basic system can also be used to quickly and conveniently lock and unlock the rear loading door of the truck at such times as the truck needs to be loaded or a large object removed from the storage area. In a still further application of the invention, a system of the type used to control the bulkhead security door is adaptable for use in locking, unlocking, opening and closing the exterior doors used by the driver to exit and enter the cab area of the truck.

These features and advantages are provided by a security system in which all vital operating components are located within the body of the truck and are not only protected from the elements but are inaccessible to unauthorized persons.

The internal bulkhead includes a doorway, a door, and guides which support the top and bottom of the door for sliding movement transversely of the doorway between a first position closing the doorway and a second position spaced from the doorway. An elongate threaded drive member is mounted on the bulkhead above the upper guide, and is journaled for rotation with the drive shaft of a reversible electric motor. Threadedly engaged with the drive member is a follower which is secured to and movable with the door.

Mounted on the interior of the bulkhead at one side of the doorway is a latch assembly which automatically locks the door as the door is moved to its closed position. This assembly includes a latch movable around a pivot point between a lower position engaging a strike carried by the door, thus locking the door, and an upper position disengaged from the strike, thus releasing the door for movement away from its closed position. Movement of the latch is effected by a solenoid which is energized at the same time that the drive motor for the door is energized. Limit switches are disposed in the path of travel of the door and positioned so as to stop the door by interrupting electrical power to the drive motor as the door reaches its open and closed positions.

Both the drive motor and solenoid are powered by the truck's low voltage battery through a control unit mounted on the bulkhead internally of the storage area. This control unit is suitably connected with the above described motor, solenoid, limit switches and elbow switch, and provided with the electronic circuitry and switching devices necessary to cause operation of those components in the sequence required to carry out the functions described in more detail hereinafter. The control unit also includes the circuitry necessary to receive wireless transmissions from the portable hand held transmitter and to convert such transmissions into suitable control signals.

In operating a delivery truck equipped with a security system of the type briefly described above, as the driver approaches a delivery point, he/she normally will apply the parking brake with one hand and operate the portable transmitter with the other hand. The signal from the transmitter will cause the circuitry in the control unit to energize the solenoid to lift the latch and release the door. The motor simultaneously is started, with its drive shaft and coupled drive member rotating in the direction necessary to move the door to its open position. As it reaches its open position, the door will actuate a limit switch which will cut off further power to the motor. Thus, the door will stop and remain in its open position while the driver enters the storage area of the truck, locates the package(s) to be delivered at that stop, and exits the storage area through the open doorway.

In exiting the storage area and leaving the truck, the driver will tap the elbow switch with a hand or elbow, causing the control unit to supply power (reversed in polarity) to the motor. The motor will re-start with its drive shaft and coupled drive member rotating in the direction necessary to move the door from its open to its closed position, at which point it will actuate the other limit switch. This will cause power to be cut off from the motor and the door to stop. As the door reaches its closed position, the latch will engage the strike of the door to automatically lock the door in its closed position without requiring the attention of or any effort on the part of the driver.

The control unit preferably is mounted on the interior of the bulkhead within the truck's storage area. Thus, it is not subject to tampering even should an unauthorized person gain entry into the cab of the truck. The elbow switch preferably is mounted on the exterior of the bulkhead in the cab area at a location conveniently accessible to the driver.

Centrally located in the back wall of the truck is a loading entryway adapted to be closed by a sectional overhead type door supported by a plurality of rollers which run in tracks mounted on opposite sides of the entryway. For security purposes, loading doors of this nature generally have been provided in the past with externally accessible key operated locking devices. As is well known in the field, however, the usual key operated mechanism is subject to tampering, is subject to freezing with freezing rain or snow and to the problem of lost keys. Thus, to provide maximum security for the truck, it is desirable to include in the present security system loading door controls which are located within the storage area of the truck and hence not subject to tampering, unauthorized entry or freezing and which can be operated readily and conveniently without the necessity of a separate key.

Accordingly, a preferred embodiment of the security system according to the present invention includes controls for both the security door in the bulkhead between the cab and storage areas of the truck as well as the structure and controls necessary to protect the loading door at the back of the delivery truck against unauthorized entry. For this purpose, the above described control unit is provided with circuitry which is adapted to receive and process a wireless signal from a second switch on the portable hand held transmitter to energize a solenoid controlled locking arrangement for the back loading door. This second solenoid is coupled to a spring loaded slide having a tapered outer end which normally projects through an aperture in one of the tracks at a point slightly above one of the rollers, thus preventing any upward movement of the roller and hence of the door. Accordingly, even if the loading door should have an externally accessible manual lock and that lock is bypassed, unauthorized entry into the storage area of the truck will be prevented. Should the driver find it necessary to enter the storage area of the truck through the rear entryway, however, he/she can do so merely by depressing the second control button on the hand held transmitter. The signal generated by such action will cause circuitry within the control unit to energize the second solenoid which in turn will move the slide transversely of and withdraw its tip from the track to permit free upward movement of the rollers in the tracks and opening of the loading door.

There is provided a time delay to keep the second solenoid energized for 20 or 30 seconds, giving the driver sufficient time in which to get to the back of the truck and open the sectional door before the second solenoid releases and the tip of the slide reenters the track. The upper surface of the tip of the slide is tapered such that the rollers of the door will bypass it readily as the door is later closed, thereby automatically locking the loading door in its fully closed position without the necessity of any further action by the person closing the loading door.

It will be understood, of course, that the present security system includes power transfer means between the power source and control unit and between the control unit and the motor and solenoids. In the case of an electrically operated system as discussed herein, the power source consists of a usual automotive battery and the transfer means consist of suitably insulated and protected electrical wiring. Or if a system using compressed air or other hydraulic fluid should be involved, the power source would comprise a means for generating compressed air or pressurized fluid, and the transfer means would consist of suitable tubing.

OBJECTS OF THE INVENTION

It is a principal object of the present invention to provide an improved security system for delivery trucks and other mobile enclosures which are frequently left unattended.

Another object of this invention is the provision of a security system which is housed within the body of a truck or other mobile enclosure and which is operable from either the interior or exterior of that body or enclosure.

A still further objective of this invention is the provision of a security system for a delivery truck or other closed body having one or more access doors which are automatically locked upon being moved to a closed position.

Yet another object of the present invention is to provide a security system which is usable with both sliding type doors and sectional type overhead tracked doors.

Another object of this invention is the provision of a security system which may be installed either while a truck is under construction or as a separate option for vehicles already in service.

A still further object of the present invention is to provide a security system which is low in cost, reliable in operational, rugged in service, and inexpensive to install, operate and maintain.

The above and other objects, features and advantages of this invention will be apparent from the following description when taken in conjunction with the accompanying drawings.

BRIEF DESCRIPTION OF THE DRAWINGS

FIG. 1 is a side elevational view, partially in cross section, of a delivery truck embodying one embodiment of the present invention.

FIG. 2 is a top sectional view of the embodiment of FIG. 1, taken on the line 2—2 of FIG. 1.

FIG. 3 is an enlarged elevational view of a portion of the outer face of the bulkhead as seen from the cab area of the embodiment of FIG. 1, showing the mechanism for opening and closing the door which controls access to the storage area of the truck.

DESCRIPTION OF THE PREFERRED EMBODIMENT

Figure 6:
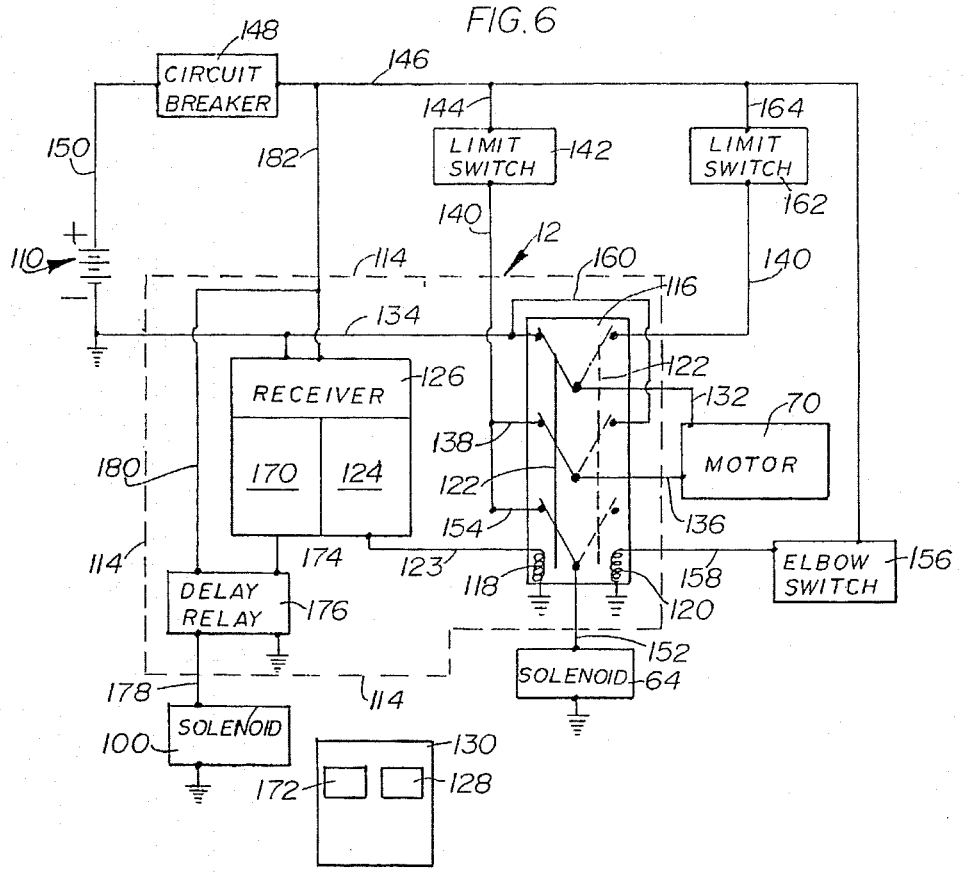
FIG. 6 is a diagrammatic view of the electrical/electronic system utilized in the embodiment of FIG. 1.

Continuing now with a more detailed description of the preferred embodiment of the present invention, reference is first made to FIGS. 1 and 2, showing a delivery type truck or vehicle 10 having a forward section 12 housing the usual motor, transmission, steering mechanism and other controls and gages (not shown) normally required to operate a motor vehicle, and a body section 13 divided by bulkhead 14 into a forward cab area 16 and a rearward storage area 18. The storage area 18 is suitably closed by outside walls 20, ceiling 22 and back wall 24. Thus, the storage area 18 comprises a closed body suitable for receiving and storing packages and other items scheduled to be delivered or picked up by the truck driver.

The forward cab area 16 is suitably equipped with a seat 26 and openings 28 and 30 disposed on opposite sides of the cab area 16 to provide an egress on each side of the truck for use by the driver in making deliveries and pickups. Slidable outside doors (not Shown) are adapted for movement relative to openings 28 and 30 between open and closed positions.

The bulkhead 14 is provided with a doorway 32 offset away from the seat 26, and a security door 34 having its upper and lower ends slidably mounted in upper and lower guide members 36 and 38. The door 34 is slidable in guide members 36 and 38 between a first position closing doorway 32 as shown by the solid lines in FIGS. 2 & 3 and a second position offset from doorway 32 as illustrated by the dotted lines in FIGS. 2 & 3. Because of the danger of theft and pilfering during those periods when the driver is out of the truck to deliver or pickup packages, the present invention provides not only for closure of door 34 in response to a simple quick tap by the driver on a conveniently located switch but for latch means for automatically locking door 34 upon its closure. This new system represents a significant and important improvement over the manually operated door and key type lock arrangements normally used in delivery trucks prior to the present invention.

Some drivers have been found in the past to be quite careful in manually closing and locking the internal security door of a delivery truck to prevent access to the storage area while the truck is parked and unoccupied. Many drivers, however, fail to close and lock the internal security door because of the extra time and effort needed to pull the door shut, find the appropriate key, insert and turn the key and then place the key in a coat or shirt pocket. As pointed out previously, in an average eight hour day, a driver may spend from 30 to 60 minutes simply in opening, closing, locking and unlocking the interior security door of the usual delivery truck.

Figure 4:
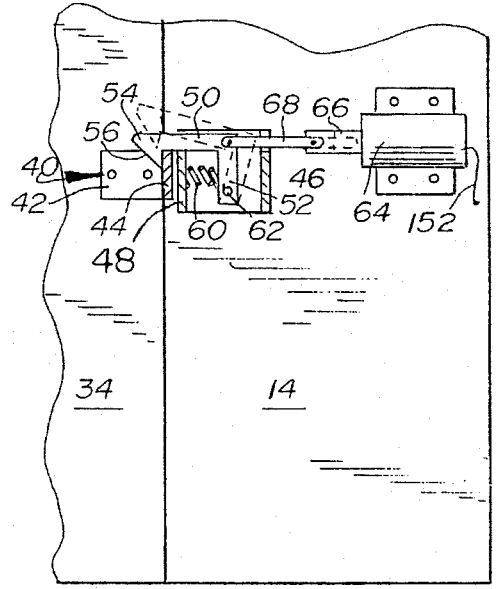
FIG. 4 is an enlarged plan view of a portion of the inner face of the bulkhead as seen from the storage area of the embodiment of FIG. 1, showing the mechanism for automatically locking the door which controls access to the storage area of the truck.

The automatic latching means or mechanism referred to above is best seen in FIG. 4. This mechanism consists of a bracket 40 having a base section 42 bolted or otherwise securely attached to door 34 adjacent its outer edge 35, and an outwardly projecting strike 44. Mounted on the interior of bulkhead 14 adjacent the edge of doorway 32 proximate bracket 40 is a latch assembly 46, consisting of a box-like mounting portion 48 bolted or otherwise securely attached to the interior of bulkhead 14, and an "L" shaped latch 50. This latch includes a downwardly depending leg 52 pivoted at its lower end at pivot point 62 on mounting portion 48, and an arm 54 projecting transversely of the upper end of leg 52 and terminating in a hooked outer end 56 engagable with outwardly projecting strike 44 to lock door 34 in its closed position. As will be noted from FIG. 4, the extreme outer surface 58 of hooked end 56 is angled inwardly such that as door 34 approaches its closed position, angled surface 58 will engage and slide over the upper edge of strike 44 causing leg 54 to pivot upwardly as shown by the dotted lines in FIG. 4 until the hooked end 56 has passed beyond and hooked behind strike 44 as indicated by the solid lines. A tension spring 60 is connected between mounting portion 48 and leg 52 to bias latch 50 forwardly around pivot point 62 thereby assuring that hooked end 56 moves downwardly and remains in place behind strike 44 upon movement of door 34 to its closed position.

So long as hooked end 56 remains hooked behind strike 44, door 34 cannot be opened from the exterior of storage area 18. Thus, packages in storage area 18 are safe from theft or pilferage during periods when the driver may be away from the truck while making deliveries or pickups.

To enter storage area 18, it is necessary to provide means for disabling the latch created by engagement between strike 44 and hooked end 56. Such disablement is effected by use of solenoid 64, the plunger 66 of which is coupled to the upper end of leg 52 by link 68. As shown by the solid lines in FIG. 4, when the latch 50 is engaged with strike 44, the plunger 66 of solenoid 64 is in an extended outer position. As will be apparent, pivotal movement of latch 50 to the upper position illustrated by the dotted lines in FIG. 4 is accomplished by energizing solenoid 64 to pull plunger 66 inwardly of solenoid 64 and pivot latch 50 upwardly. Such pivotal movement, of course, disables the latch whereby the door 34 may then be opened.

As pointed out hereabove, security door 34 is slidable in guide means or members 36 and 38 between a first position closing doorway 32 and a second position spaced from and opening doorway 32 to permit the driver to enter the storage area 18 to select a package for delivery or to store a newly picked up package. In the present embodiment, such movement is provided by operating means as best illustrated in FIG. 3. As shown therein, the operating means includes a low voltage D.C. motor 70 of a type having an armature and drive shaft 72 which are reversible in rotation in response to reversal of the polarity of the electric power used to energize the motor. The motor 70 is mounted on the exterior of bulkhead 14 with its drive shaft 72 axially aligned with and coupled to drive means comprising an elongate threaded drive member 74 positioned on the bulkhead 14 slightly above and parallel to the upper guide member 36 and journaled for rotation thereon by bearing blocks 76 and 78. Mounted on and movable along drive member 74 in response to rotation thereof is a follower member 80 which is operatively engaged with door 34 by connector 82. It will be seen, therefore, that by energizing motor 70, drive shaft 72 and drive member 74 will be caused to rotate. Such rotation will result in follower 80 moving axially along drive member 74 thereby causing concomitant movement of door 34 transversely of doorway 32 in the guide members 36 and 38.

As indicated above, reversal of the polarity of the electric power to motor 70 will cause reversal of the direction of rotation of drive shaft 72 and drive member 74 and reversal of the direction of movement of follower 80 and door 34. Thus, depending on the polarity of the power provided to motor 70, the door will move either to its open or closed position. As will be understood, for the door to move away from its closed position as illustrated in FIGS. 2, 3, & 4 it is first necessary to disable the latch means comprised of the latch 50 and strike 44 before the door 34 will be free to move.

In the back wall 24 of the truck body section 13 is an entryway 84 which normally is used primarily for loading the truck with the packages, boxes, etc. to be delivered during the day. Thus, generally speaking, back entryway 84 will not be used to the same extent as the internal doorway 32 in bulkhead 14. However, on occasion it will be necessary for a driver to use the loading door 84 to load or unload larger packages or to reach packages which may not be readily accessible from the front. Thus, it is important to provide a secure yet easily and quickly operated system for controlling access to the storage area 18 through the rear loading entryway 84.

Figure 5:
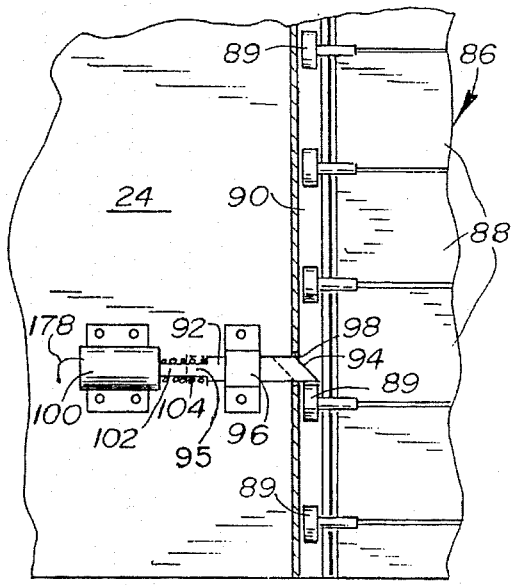
FIG. 5 is a partial elevational view of the inside back wall of the truck depicted in FIG. 1 showing the mechanism for unlocking and automatically locking the rear loading door upon movement thereof to its closed position.

In the present embodiment, such a system includes an overhead type sectionalized door 86 consisting of a plurality of horizontally disposed sections 88 which are hinged together along their adjacent edges and which are supported for movement between a first lower position closing the entryway 84 and a second overhead position remote from and opening entryway 84. As best shown in FIG. 5, door 86 is supported for such movement by a plurality of support members consisting of rollers 89 extending from opposite edges of the door 86 into rolling engagement with a pair of parallel track members 90 disposed on opposite sides of the entryway 84. These track members 90 extend from adjacent the floor of the truck upwardly alongside of the entryway 84 and then curve rearwardly along roofline 22 a distance sufficient to permit movement of door 86 beyond the top of entryway 84.

Again referring to FIG. 5, there is provided lock means for automatically locking door 86 in its closed position upon movement to that position. Such lock means comprises a slide member 92 which terminates at one end in an outer tapered section 94 and at the other end in a reduced circular section 95. The slide 92 is mounted on back wall 24 by bracket 96 for limited reciprocal movement transversely of the track 90 between a first inner position in which the tapered section 94 extends through an aperture 98 in track 90 into the interior of the track 90 at a position spaced slightly above one of the rollers 89, and a second outer position in which the tapered section 94 is withdrawn from the track 90. As illustrated in FIG.5, when slide 92 is disposed in its inner position, tapered section 94 will block one of the rollers 89 from moving upwardly in track 90 which, in turn, prevents any upward movement of all other rollers 89, thus effectively locking door 86.

Movement of slide 92 from its first inner position to its second outer position (indicated by the dotted lines in FIG. 5), will cause withdrawal of tip section 94 from track 90 to release rollers 89 for movement in tracks 90, thereby unlocking and releasing door 86. Thus, loading door 86 may be moved to an overhead position opening entryway 84 and providing access to storage area 18 for loading or unloading purposes.

Movement of slide 92 between its inner and outer positions is effected in the present embodiment by use of a solenoid 100 having a plunger 102 coupled to reduced inner end 95 of slide 92. Upon being energized, solenoid 100 will draw plunger 102 and slide 92 toward the body of the solenoid 100 and withdraw tapered section 94 from aperture 98, thereby disabling the lock means provided for loading door 86. Disposed over coupled plunger 102 and circular section 95, between the end of solenoid 100 and the outwardly facing shoulder of slide 92, is a compression type coil spring 104. This spring 104 biases slide 92 toward its inner position as illustrated by the solid lines in FIG. 5, whereby slide 92 is automatically moved to that position upon release of solenoid 100.

As will be explained in greater detail hereinafter, in using the present security system to control the latching and unlatching of sectional loading door 86, the solenoid 100 normally is energized only for a relatively short period and not during the entire time that door 86 may be disposed overhead in its open position. In most instances, therefore, the solenoid 100 will be de-energized and the slide 92 returned to its inner position with tip section 94 projecting into track 90 before the driver is ready to pull the door 86 down to its closed position. A feature of the present invention is that such closure can be readily accommodated without the necessity of re-energizing solenoid 100. This feature is a result of the upwardly angled surface of tapered section 94 of slide 92, which provides a camming action to push slide 92 outwardly of track 90 as tapered section 94 is contacted and bypassed by successive rollers 89 as they roll downwardly in track 90 with the descending door 86. The biasing action of spring 102 will, of course, automatically return the slide 92 to its inner position as quickly as it has been bypassed by a roller 89.

Another feature of this door latching arrangement is that the door will latch at any position in which a roller 89 is disposed below tapered section 94 of slide 92. Thus, this arrangement will accommodate an occasional or unusual need to leave the door 86 partially open without breaching security for the storage area 18. For example, should ventilation be needed as for a caged pet or if it is necessary to accommodate a long package, the door 86 can be moved to a position leaving a small opening without danger that an unauthorized person will be able to further open the door because of the interaction of tapered section 94 and whatever roller 89 is positioned immediately therebelow.

As will be understood, in the present embodiment, motor 70 and solenoids 64 and 100 are operated electrically from a low voltage D.C. power source comprising the usual automotive battery 110 carried by the truck 10 for ignition, lighting and like purposes. The motor 70 and solenoids 64 and 100 are not directly operated from battery 110, however, but are selectively connected thereto through and controlled by control means comprising a control unit 112 mounted on bulkhead 14 internally of the storage area 18. The details of this control unit are best shown in FIG. 6, wherein its basic components, shown diagrammatically, are enclosed within dotted lines 114 for convenient identification.

Within the control unit 112 is a triple pole, double throw electromechanical latching relay 116 having a pair of coils 118 and 120 for actuating the armature 122 and switching the contacts between the two sets of poles. Such switching is accomplished by movement of armature 122 and its related contacts between a first position as depicted in relay 116 by solid lines and a second position as depicted in the relay by dotted lines. Movement of armature 122 to its first position is effected by energizing relay coil 118 in response to receipt of a first control signal through wire 123 from the first channel 124 of receiver 126. This control signal is generated by the first channel of receiver 126 upon receipt therein of a wireless signal generated upon actuation of a first switch 128 of a remote relatively small portable hand held transmitter 130. This wireless signal preferably is coded and capable of being varied for security purposes. The receiver 126 includes circuitry adapted to compare the coded signal from the transmitter 130 with a predetermined code previously programmed into the receiver, and upon a match of the codes to cause first channel 124 to output a first control signal for energizing the first coil 118 of the relay 116, thus moving the armature 122 and related contacts of relay 116 to their first position as depicted in FIG. 6 by the solid lines in relay 116.

When disposed in such first position, armature 122 will position the contacts of relay 116 such that motor 70 is connected with the negative side of the power source 110 through wires 132 & 134, and with the positive side through wires 136, 138 & 140, normally closed limit switch 142, wires 144 & 146, circuit breaker 148, and wire 150. At the same time, solenoid 64 is connected with the positive side of the power source 110 through wires 152, 154 & 140, normally closed limit switch 142, wires 144 & 146, circuit breaker 148 and wire 150, and with the negative side through the frame of the truck. As both of these electrical connections occur at the same time, solenoid 64 and motor 70 will be energized simultaneously.

As will be recalled from earlier discussion herein, the latch means holding the security door 34 in its closed position will be disabled upon operation of solenoid 64, causing the latch 50 of the latch assembly 46 to pivot upwardly to disengage hooked outer end 56 from strike 44, thereby unlocking and permitting door 34 to move from its closed position as follower 80 moves along drive member 74 in response to rotation of drive shaft 72 and drive member 74 upon operation of motor 70. As will be clear to those in the art, the direction of rotation of the armature and drive shaft 72 of motor 70 and coupled drive member 74 should be such that (referring to FIG. 3) the follower 80 and connected door 34 will move to the right from the closed position depicted by solid lines toward the open position depicted by dotted lines. Such movement will continue until doorway 32 has been opened and the inner edge 37 of door 34 contacts the sensor of limit switch 142, opening the contacts in limit switch 142 and breaking the connection between motor 70 and power source 110. This, of course, will cause door 70 to stop and remain in its open position, thus providing access to storage area 18.

As the driver leaves storage area 18 after selecting a package to be delivered or depositing a package just picked up, it is merely necessary for him/her to tap normally open elbow switch 156 to cause the door 34 to move from its open position to its closed position and to lock automatically in that position. Such a tap will generate a second control signal, connecting coil 120 with the positive side of power source 110 through wire 158, elbow switch 156, wire 146, circuit breaker 148 and wire 150, and with the negative side through the frame of the truck. This connection will energize coil 120, causing armature 122 and the associated contacts to move to the second position as depicted by the dotted lines in relay 116 in FIG. 6.

Movement of armature 122 and associated contacts to their second position will again connect motor 70 to the power source 110 but such connection will be reversed in polarity from the first connection. In this position, the negative connection will be made through wires 136, 160 & 134, and the positive connection through wires 132 and 140, normally closed limit switch 162, wires 164 & 146, circuit breaker 148 and wire 150. Because of this reversal in polarity, the rotation of armature and drive shaft 72 of motor 70 and coupled drive member 74 will be reversed from the direction which caused the door 34 to open. Accordingly, follower 80 and associated door 34 will (referring to FIG. 3) move to the left until the outer edge 35 of door 34 contacts the sensor of normally closed limit switch 162 to break the positive connection between motor 70 and power source 110. Such a break will cause motor 70 to stop and the follower 74 and door 34 to discontinue movement.

As pointed out heretofore, movement of door 34 to its closed position will automatically cause the latch means 50 to engage strike 44, hence, locking door 34 against movement away from its closed position except in response to receipt by receiver 126 of another signal from switch 128 of transmitter 130.

Turning now to the control of loading door 86, the transmitter 130 includes a switch 172 which, upon being pressed, will generate a further wireless signal which is received by receiver 126. As with the first signal from transmitter 130, this second signal preferably is coded and capable of being varied for security purposes. Receiver 126 includes circuitry adapted to compare the coded signal from switch 172 with a predetermined code previously programmed into the receiver, and upon matching of the code to cause channel 170 to output a third control signal. As indicated in FIG. 6, this third control signal is transmitted through wire 174 to the coil of a normally open time delay relay 176 and after energizing such coil the signal is grounded through the frame of the truck.

Upon energization of the coil of time delay relay 176, the contacts of the relay will close to connect solenoid 100 to the positive side of power source 110 through wire 178, relay 176, wires 180, 182 & 146, circuit breaker 148, and wire 150. Solenoid 100 is grounded through the frame of the truck. As explained in more detail hereinabove, energization of solenoid 100 will cause slide 92 of the lock means for loading door 86 to move transversely from its inner to its outer position (see FIG. 5) thereby withdrawing tapered tip 94 from track 90. Such withdrawal will, of courser free door 86 for movement from its closed to its open position to provide access to storage area 18 through entryway 84. In order to provide the driver sufficient time in which to reach the back of the truck and open door 86 after pressing switch 172, time delay relay 176 preferably will keep solenoid 100 energized for 20 or 30 seconds. After the door 86 has been opened, there is no need to keep solenoid 100 energized and the slide 92 held in its outer position as the door can be closed even after the tapered tip 94 has reentered track 90.

The use of wireless systems for generating control signals is well known in various fields, including the automotive and trucking industries. For example, U.S. Pat. No. 4,602,256 shows a system using ultrasonic waves; U.S. Pat. No. 4,794,268 suggests the use of radio waves or signals; and U.S. Pat. No. 4,895,009 illustrates a wireless system without suggesting a specific type of wave. Because of the well known nature of such wireless systems, including those with circuits for matching coded signals, it is not believed necessary to go into any extended discussion thereof in this application. Also, it will be understood that while the preferred embodiment described herein employs electromechanical relays and various discrete electronic components, such relays and components may be replaced by solid state components, including integrated circuits.

As described heretofore, a delivery truck or similar mobile unit equipped with the system provided by this invention will be found to provide superior protection against theft and pilferage for the packages and cargo carried in its closed storage area while at the same time substantially reducing the time, effort and attention required of the driver to maintain that security throughout a busy delivery route involving numerous stops for package delivery and pickup. Instead of having to carry a set of keys and work with the usual mechanical locks, the driver merely carries a small transmitter in a readily accessible pocket. In many cases, it will not even be necessary for the driver to remove the transmitter from the pocket, but rather the buttons thereon may be pressed through the fabric of the pocket.

To open the back loading door 86 for loading packages to be delivered, the driver merely presses button 172 of transmitter 130 to generate a coded signal which is then received by receiver 126, matched with a pre-programmed code and passed to the second channel 170. The control signal generated by channel 170 is then used to energize time delay relay 176 which, in turn, energizes solenoid 100 to cause slide 92 to move to its outer position to free door 86 for movement to its open overhead position. After the storage area has been loaded, the door is simply pulled down to its closed position and automatically locked in that position without any effort or further attention or action by the driver.

As the driver reaches a delivery point and stops the truck, the parking brake may be set with one hand and button 128 of the transmitter 130 pressed with the other hand. Such action causes transmitter 130 to output a coded signal which will be picked up by receiver 126, matched in code and then fed to first channel 124. From there a first control signal will be transmitted to coil 118 of latching relay 116 which will then cause the relay to connect power source 110 with solenoid 64 to operate latch 50 and unlock door 34 and simultaneously with motor 70 to move door 34 from its closed position to its open position. The driver may then enter the storage area 18, select the package(s) to be delivered, exit through the open doorway 32, tap elbow switch 158, and then exit the truck for the delivery. In response to the tap on switch 158, the door 34 will close within a few seconds and automatically lock. Thus even if an unauthorized person should enter the cab of the truck during the driver's absence, he/she will not be able to gain access to any of the packages held in the storage area.

As the driver is approaching the truck after making a pick up, he/she merely presses button 128 of transmitter 130 to generate a signal which will be picked up by receiver 126 and used to unlock and open door 34. After depositing the package in storage area 18 and exiting the area through doorway 32, a simple tap on the elbow switch 158 prior to starting the truck will cause door 34 to close and lock. Thus the time normally spent in the past in manually locking, unlocking, opening and closing the security door of a delivery truck has to a great extent been eliminated.

Obviously, many modifications and variations of the present invention are possible in light of the teachings of this application. It is to be understood, therefore, that the foregoing descriptions and appended drawings are illustrative only and are neither intended nor desired to limit the scope of the invention.

For example, while the preferred embodiment of this invention involves the use of electricity as the power medium, it would be possible to use compressed air, gas or other hydraulic fluid as the power source through the employment of air compressors, cylinders, air driven motors, tubing instead of electrical wires, and other suitable components. Also, as mentioned previously, it is anticipated that a mechanism and control of the type used with the security door 34 would be adaptable readily to close and lock the egress doors which are provided in the cab area of the usual truck or other like mobile unit.

Having thus described certain preferred embodiments and features of the invention, what is claimed as new and novel and desired to be protected by Letters Patent is as follows:

1. A security system for a delivery truck having a bulkhead dividing the interior of the truck into storage and cab areas, a doorway located in the bulkhead, a door mounted for horizontal movement transversely of the doorway between a first position closing the doorway ("closed position") and a second position spaced from and opening the doorway ("open position"), and a power source, the security system comprising (A) guide means positioned on the bulkhead to slidingly support said door during movement thereof between its said open and closed positions,
    (B) operating means comprising
        (i) motor means and
        (ii) drive means operatively engaging said motor means and said door, said drive means being movable by said motor means in a first direction to move said door to its open position and in a second direction to move said door to its closed position,
    (C) latch means for automatically locking said door upon movement of said door to its closed position, said latch means being isolated from and not accessible to said cab area,
    (D) actuating means for disabling said latch means to permit movement of said door away from its closed position,
    (E) control means communicating with said power source, said control means being operable in response to the reception of
        (i) a first control signal to connect said power source (a) to said actuating means to disable said latch means and (b) to said motor means in a first polarity to move said drive means in said first direction and said door from its closed position to its open position to provide access to the storage area and
        (ii) a second control signal to connect said power source to said motor means in said second polarity to move said drive means in said second direction and said door from its open position to its closed position wherein said latch means automatically locks said door to prevent access to the storage area,
    (F) first limiting means operatively interposed between said power source and said control means and isolating said power source from said motor means upon movement of said door to its closed position,
    (G) second limiting means operatively interposed between said power source and said control means and isolating said power source from said motor means upon movement of said door to its open position,
    (H) a first manually operable remote control switch for selectively generating said first control signal, and
    (I) a second manually operable switch disposed within the cab area for selectively generating said second control signal.

2. A security system according to claim 1 wherein said power source comprises a source of electrical power, characterized by (A) said motor means comprising an electrically operated motor having a rotatable drive shaft,
    (B) said drive means comprising an elongate threaded drive member mounted on said bulkhead in a generally parallel relationship with said guide means, said drive member being disposed for rotation with said drive shaft, (C) a follower secured to said door and threadedly engaged with and movable relative to said drive member upon rotation of said drive shaft and said drive member, and (D) relay means provided by said control means, said relay means being energized upon receipt by said control means of
  (i) said first control signal, to connect said power source simultaneously to (a) said actuating means to disable said latch means and (b) said motor in said first polarity to activate said drive shaft and said drive member to move said door in a first direction along said drive member from its closed to its open position, and
  (ii) said second control signal, to connect said power source to said motor in said second polarity to activate said drive shaft and said drive member to move said door in a second direction along said drive member from its open to its closed and locked position.

3. A security system according to claim 2 characterized by;
(A) said actuating means for said latch means being an electrically operated solenoid, and
(B) said relay means being an electromagnetic latching relay having an armature movable
  (i) to a first position in response to said reception by said control means of said first control signal to connect said power source with said solenoid and said motor in said first polarity and
  (ii) to a second position in response to said reception by said control means of said second control signal to connect said power source with said motor in said second polarity.

4. A security system according to claim 3, characterized by
(A) said latch means being located within said storage area,
(B) said motor and said threaded drive member being mounted on the bulkhead externally of said storage area above said doorway,
(C) said control means being mounted internally of said storage area,
(D) said first manually operable remote control switch comprising a portable transmitter, and
(E) said second manually operable switch being mounted within the cab area in proximity to said doorway.

5. A security system according to claim 4, characterized by
(A) an entryway in said storage area remote from said doorway,
(B) parallel track means disposed on opposite sides of said entryway,
(C) a sectional door movable between a first position closing said entryway ("closed position") and a second position spaced from said entryway ("open position"),
(D) a plurality of support members comprising rollers extending from opposite sides of said sectional door into engagement with said track means,
(E) lock means movable transversely of one of said track means and provided with a tip portion projectable through an aperture in said one track means, said lock means being movable between
  (i) an outer position with said tip portion disposed externally of said track means and
  (ii) an inner position with said tip portion projecting into said track means to block upward movement of said support members in said track means and prevent unauthorized opening of said sectional door,
(F) release means comprising a second solenoid communicating with said control means, said control means connecting said power source to said second solenoid in response to said reception by said control means of a third control signal to move said lock means to its said outer position and permit movement of said sectional door from its said closed position to its said open position,
(G) an angled upper cam surface on the tip portion of said lock means, said cam surface causing said lock means to be forced outwardly of said one track means upon being contacted by said rollers moving in a downwardly direction to permit passage of said support member and movement of said sectional door to its said closed position, and
(H) delay means operatively disposed between said control means and said second solenoid and adapted to maintain said second solenoid energized and said lock means in said outer position for a predetermined time period following said reception of said third control signal by said control means,
(I) means resiliently biasing said lock means toward its said inner position upon said release means being de-energized whereby said lock means is permitted to reciprocate between its said inner and outer positions as said rollers engage said cam surface during movement of said sectional door from its said open position to its said closed position, and
(J) a third manually operable switch for selectively generating said third control signal.

6. A security system according to claim 5 wherein said cab area is positioned forwardly of the storage area and provided with an exterior egress, and the entryway is disposed in the rearward wall of the delivery truck, characterized by
(A) said first and said third switches being included in a portable transmitter adapted to be carried by the driver, said switches being operable from either the interior or exterior of the delivery truck, and
(B) said second switch comprising a manually operable normally open momentary contact switch disposed in said cab area proximate said doorway in a location readily accessible to the driver while in or while entering or leaving the cab area through said exterior egress.

7. A security system for a delivery truck having a rearward storage area, a forward cab area, a bulkhead disposed between the cab and storage areas and provided with a doorway, a door mounted for movement transversely of the doorway between a first position closing the doorway ("closed position") and a second position spaced from the doorway ("open position"), an entryway disposed in the rearward wall of the delivery truck, a sectional door movable relative to the entryway between a first position closing the entryway ("closed position") and a second position spaced from the entryway (open position"), and a low voltage electrical power source provided by the delivery truck, characterized by
(A) operating means for moving said door horizontally between its said open and closed positions, said operating means comprising (i) motor means and (ii) drive means operatively engaging said motor means and said door, (B) latch means for automatically locking said door upon movement thereof to said closed position, said latch means being isolated from and not accessible to said cab area, (C) actuating means for disabling said latch means to permit movement of said door away from its said closed position, (D) lock means for automatically latching said sectional door in its said closed position upon movement thereof to said closed position, (E) release means for disabling said lock means to permit movement of said sectional door from its said closed position to its said open position, (F) control means communicating with said power source, said control means being operable in response to the reception of (i) a first control signal to connect said power source to (a) said actuating means to disable said latch means and (b) said motor means in a first polarity to move said drive means in a first direction to move said door from its closed to its open position, (ii) a second control signal to connect said power source to said motor means in a second polarity to move said drive means in a second direction to move said door from its open to its closed position, (iii) a third control signal to connect said power source to said release means to disable said lock means to permit manual movement of said sectional door from its closed to its open position, (iv) said lock means being ineffective to prevent movement of said sectional door from its said open to its said closed position, (G) a first manually operable remote control switch for selectively generating said first control signal, (H) a second manually operable momentary contact switch disposed within said cab area for selectively generating said second control signal and (I) a third manually operable remote control switch for selectively generating said third control signal.

8. A security system according to claim 7, characterized by (A) guide means positioned on said bulkhead to support said door during movement thereof between its said open and closed positions, (B) said motor means comprising (i) an electrically operated motor mounted on said bulkhead, said motor being connected to said control means and provided with a rotatable drive shaft and (ii) said drive means comprising an elongate threaded drive member mounted on said bulkhead in a generally parallel relationship with said guide means, said drive member threadedly engaging said drive shaft and said door and being rotatable with said drive shaft in a first direction to move said door to its open position and in a second direction to move said door to its closed position, (C) said actuating means comprising a first solenoid connected to said control means, (D) said control means (i) energizing said first solenoid to disable said latch means and activate said motor in a first polarity to move said door from its closed position to its open position in response to said reception by said control means of said first control signal and (ii) activating said motor in a second polarity to move said door from its open position to its closed position in response to said reception by said control means of said second control signal, and (E) said release means comprising a second solenoid connected to said control means, said second solenoid being energized to disable said lock means in response to said reception by said control means of said third control signal.

\* \* \* \* \*